United States Patent

Matsuo

(10) Patent No.: US 9,754,394 B2
(45) Date of Patent: Sep. 5, 2017

(54) ANALYTICAL DATA DISPLAY PROCESSING DEVICE

(71) Applicant: SHIMADZU CORPORATION, Kyoto-shi, Kyoto (JP)

(72) Inventor: Kiriko Matsuo, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 14/573,354

(22) Filed: Dec. 17, 2014

(65) Prior Publication Data

US 2016/0180555 A1  Jun. 23, 2016

(51) Int. Cl.
*G06F 3/14* (2006.01)
*G09G 5/14* (2006.01)
*G06T 11/20* (2006.01)
*G06F 3/0482* (2013.01)
*G06F 3/0484* (2013.01)
*G06F 3/0489* (2013.01)

(52) U.S. Cl.
CPC .......... *G06T 11/206* (2013.01); *G06F 3/0482* (2013.01); *G06F 3/04842* (2013.01); *G06F 3/04897* (2013.01); *G06F 3/14* (2013.01); *G09G 5/14* (2013.01); *G06F 2203/04803* (2013.01); *G06F 2203/04804* (2013.01); *G09G 2340/0464* (2013.01); *G09G 2340/14* (2013.01)

(58) Field of Classification Search
None
See application file for complete search history.

(56) References Cited

U.S. PATENT DOCUMENTS

| | | | | |
|---|---|---|---|---|
| 2011/0004839 | A1* | 1/2011 | Cha | G06F 9/4443 715/765 |
| 2013/0100154 | A1* | 4/2013 | Woodings | G06T 11/206 345/589 |
| 2014/0012515 | A1 | 1/2014 | Taneda | |
| 2014/0132180 | A1* | 5/2014 | Ukai | H05B 33/086 315/292 |
| 2014/0372919 | A1* | 12/2014 | Fan | G06T 11/60 715/765 |
| 2015/0070513 | A1* | 3/2015 | Gotoh | H04N 1/00132 348/207.1 |

FOREIGN PATENT DOCUMENTS

| | | |
|---|---|---|
| JP | 2007-147464 A | 6/2007 |
| JP | 2011-237311 A | 11/2011 |
| JP | 2011-242255 A | 12/2011 |

* cited by examiner

*Primary Examiner* — Kee M Tung
*Assistant Examiner* — Yanna Wu
(74) *Attorney, Agent, or Firm* — Sughrue Mion, PLLC (57) ABSTRACT

Thumbnail images indicating images of a display layouts prepared in advance or created by the user are stored together with display layout data, and the thumbnail images are displayed as a list on a layout thumbnail bar in an analysis result display window on the display screen. The analyzer looks at the images so as to grasp the content of each display layout and then selects an appropriate thumbnail image. As a result, a screen in which chromatograms, mass spectrums, or the like are assigned to each of the regions in the graph display region is created in accordance with the selected display layout and displayed on a monitor screen.

20 Claims, 8 Drawing Sheets

ANALYTICAL DATA DISPLAY PROCESSING DEVICE

TECHNICAL FIELD

The present invention relates to an analytical data display processing device for displaying various analytical results such as a chromatogram, a spectrum, or a mapping image created based on data collected by various analytical devices such as a liquid chromatography (LC), liquid chromatographic mass spectrometer (LC/MS) or a gas chromatographic mass spectrometer (GC/MS) on a display screen.

BACKGROUND ART

With a liquid chromatographic mass spectrometer (LC/MS) using a mass spectrometer as a detector for a liquid chromatograph, a chromatogram such as a total ion chromatogram or a mass chromatogram for any mass to charge ratio can be created in addition to a mass spectrum at any time based on data obtained by analysis. In addition, with an LC/MS which also uses an ultraviolet-visible spectrophotometer such as a photodiode array (PDA) detector in addition to a mass spectrometer as a detector, an absorption spectrum at any wavelength can be created in addition to mass spectrums or various chromatograms based on data obtained by analysis. Further, with such a device, the three-dimensional data for the time, signal intensity, and mass-to-charge ratio or wavelength is obtained, so a graph such as a mapping image can also be created based on this data. Similarly for liquid chromatography (LC), analysis can be performed using a variety of detectors. Data are represented as traces in the appropriate dimensions. For example, the evaporative light scattering detector (ELSD) gives voltage against time. The refractive index detector (RID) gives refractive index units against time. The ultra-violet-visible detector cum PDA detector gives two or three dimensional data in terms of absorbance units against time or absorbance units against wavelength against time, respectively. The conductivity detector and fluorescence detector give voltage against time.

When analyzing the analysis results obtained by such an analytical device or comparing the analysis results of a plurality of samples, the analyzer appropriately screens and selects various spectrums, chromatograms, or the like, displays the data on a screen, and then closely observes a waveform in the vicinity of a target area (time, mass-to-charge ratio, or the like) or compares the shapes of a plurality of waveforms. In order to perform such an analysis smoothly with a conventional analytical device, the display region of a single window displayed on a monitor screen is divided into a plurality of regions, and the respective chromatograms, mass spectrums, or the like are displayed in each of the display regions (see Patent Literatures 1 and 2).

Figure 13:
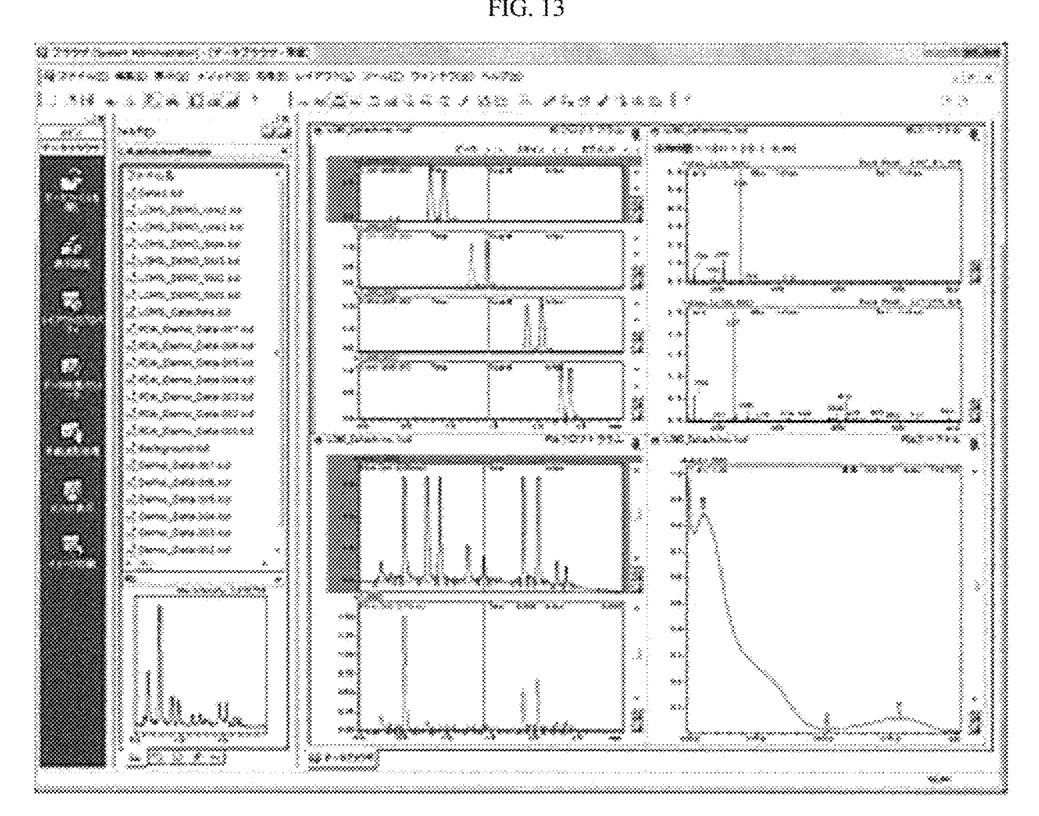
FIG. 13 illustrates an example of a display screen in a conventional LC/MS system.

For example, in Non-Patent Literature 1, an example of a screen displayed by executing commercially available LC/MS data processing software on a personal computer is disclosed. This screen display example is illustrated in FIG. 13. In this example, the display region of a pane covering most of the window is divided into four regions in a windowpane shape, and the respective chromatograms, mass spectrums, or the like are arranged in each of the display regions.

In such an analytical data display processing device, there is a substantial amount of freedom in the display layout within the window with regard to the manner in which the chromatograms or spectrums are arranged within the window or the sizes of the respective display frames. Therefore, the analyzer typically changes the layout appropriately in accordance with the objective or the state of the analytical data that is obtained so that the data can be easily viewed or analyzed. However, the conventional operation for changing the layout in this way is performed by trial and error, which leads to the problem that it is troublesome for the analyzer to make the display easily viewable as desired.

In some devices, positional information or the like of each display region is saved after the layout is changed, and this information is used so that the most recently saved layout can be reproduced when the device is started next. However, with such a device, only the most recent layout can be reproduced, and it is not possible to restore the layout in accordance with the purpose or the situation. On the other hand, there are also devices which make it possible to save a layout that has been set appropriately by an analyzer by assigning a name to the layout, and with such a device, it is possible to restore a layout created at any time. However, it is necessary for the actual analyzer to remember the name assigned to the saved layout, which places a burden on the analyzer. In addition, when a plurality of analyzers share a single device, it is difficult for each analyzer to use layouts created by other users.

Further, as described in Non-Patent Literature 1, in order to compare mass chromatograms for a plurality of mass-to-charge ratios or chromatograms for different samples with a conventional analytical data display processing device, the analyzer can select a parallel display in which a plurality of chromatograms are arranged in the vertical direction, base-shifted overlapping display in which data is arranged by gradually shifting a baseline in the vertical axis (intensity axis) direction little by little on the same graph, or overlapping display without shifting in which only the color display is changed without shifting the baseline on the same graph (see Patent Literature 3).

When multiple chromatograms are displayed in an overlapping manner without shifting in order to compare the chromatograms, even if the display colors of each of the chromatogram curves differ, the display colors themselves become unclear in locations where the curves overlap. Therefore, the chromatogram on which the analyzer is focusing attention may become difficult to view. In particular, when portions detected as peaks are displayed by filling in these portions, chromatograms hidden in the background may become completely invisible. In base-shifted overlapping display, although it is easy to differentiate each chromatogram, it is difficult to compare signal intensities when the baseline is shifted, and when multiple chromatograms are displayed in a base-shifted overlapping manner, they may occupy a wide space in the vertical axis direction. On the other hand, when multiple chromatograms are displayed in parallel, an even wider space necessary in the vertical axis direction, and a plurality of chromatograms are arranged at a distance from one another, which makes it difficult to compare the detailed shapes of the waveforms.

In particular, in LC/MS using a mass spectrometer or a PDA detector as described above, there are an extremely large number of chromatograms emerging in the time axis direction from data collected in one cycle of analysis. Therefore, when using base-shifted overlapping display to compare chromatograms obtained for a plurality of samples, the number of chromatograms is too large, so it is not possible to identify each chromatogram, which often makes this method impractical. In addition, when parallel display is used, the intensity axis of each chromatogram becomes extremely small due to size restrictions of the display frames, so this method is also impractical. That is, conventional analytical data display processing devices have the problem that when the number of chromatograms to be displayed is quite large, a display that is sufficiently practical cannot necessarily be realized even when conventional overlapping display or parallel display is used.

PRIOR ART LITERATURES

Patent Literatures (PATENT LITERATURE 1) Japanese Unexamined Patent Application Publication 2011-237311
(PATENT LITERATURE 2) Japanese Unexamined Patent Application Publication 2011-242255
(PATENT LITERATURE 3) Japanese Unexamined Patent Application Publication 2007-147464

Non-Patent Literatures (NON-PATENT LITERATURE 1) "LabSolution LCMS—Software for achieving maximum analysis performance", Shimadzu Corporation, (Search from Jun. 11, 2012), Internet, <URL: http://www.an.shimadzu.co.jp/lcms/lcms2020/lcms5.htm>

SUMMARY OF THE INVENTION

Problems to be Solved by the Invention

The present invention was conceived in light of the problems described above, and the main object of the present invention is to provide an analytical data display processing device which allows an analyzer to easily select a layout that facilitations operations by the analyzer and to display the analysis results in accordance with the objective of analysis, the situation, or the like, and which has high operating efficiency so as to be able to reduce operational mistakes or judgment mistakes.

Another object of the present invention is to provide an analytical data display processing device capable of displaying a chromatogram on which the analyzer is focusing attention so that the chromatogram is highly identifiable, while reducing the area occupied by the display regions on the display screen when displaying multiple chromatograms at once.

Means for Solving the Problems

The present invention, which was conceived in order to solve the problems described above, is an analytical data display processing device for creating graphs including chromatograms or spectrums based on analytical data collected by sample analysis and performing processing to display one or a plurality of graphs by assigning the graphs to each of a plurality of display regions set within a display screen; the device comprising:

a) a layout information storage means for storing information regarding the display layout defining at least the settings of a plurality of display regions within the display screen, the assignment of graphs displayed in each of the display regions, and the display format of graphs assigned to each of the display regions;

b) a layout thumbnail presenting means for providing a list display of thumbnail images showing images of the display layout stored in the layout information storage means in a display region differing from the display regions where the graphs are assigned within the display screen;

c) a selection and indication means for allowing an analyzer to select and indicate one of the thumbnail images displayed by the layout thumbnail presenting means; and d) a display processing means which, when one thumbnail image is selected by the selection and indication means, constructs, displays, and outputs a display screen on which a graph created based on designated analytical data is arranged in accordance with the regulations of the display layout stored in the layout information storage means so as to correspond to the thumbnail image.

Here, the analytical device for collecting analytical data is typically a chromatograph device such as a liquid chromatograph or gas chromatograph device using a detector such as a mass spectrometer or a PDA detector capable of obtaining signal intensity information taking a dimension other than time as a parameter.

In the present invention, a "chromatogram" may be a graph which demonstrates not only simply temporal changes in signals (signal intensity) obtained by the analytical device, but also temporal changes in signals obtained by performing appropriate waveform processing or data processing on such signals. Therefore, when the analytical device is a chromatographic mass spectrometer, the chromatograms include not only general total ion chromatograms and mass chromatograms, but also chromatograms determined by adding or subtracting mass chromatograms for a plurality of mass-to-charge ratios, base peak chromatograms in which peaks indicating the maximum signal intensity are collected, mass defect chromatograms, isotopic filtered chromatograms, and neutral loss chromatograms.

On the other hand, a "spectrum" in the present invention may be a mass spectrum when the analytical device is a chromatographic mass spectrometer, or an absorption spectrum, a reflection spectrum, or the like when the analytical device is a chromatograph device in which an ultraviolet-visible spectrophotometer such as a PDA detector is used as a detector. Of course, these spectrums also include not only simple spectrums for specific mass-to-charge ratios or wavelengths, for example, but also spectrums obtained by means of appropriate data processing such as spectrums in which spectrums for a plurality of mass-to-charge ratios or wavelengths are added or subtracted.

In the analytical data display processing device of the present invention, when an analyzer performs a prescribed operation, for example, the layout thumbnail presenting means provides a list display of images of each display layout stored in the layout information storage means—that is, thumbnail images that provide a general understanding of the content thereof—in a display region differing from the display regions where graphs such as chromatograms or spectrums are assigned within the display screen. The list display described here is not limited to cases in which all information can necessarily be viewed at once, and it also includes configurations in which information can be displayed by a simple operation such as scrolling or tab switching. The thumbnail images demonstrating images of the display layout are preferably stored in the layout information storage module as a part of the display layout information, but thumbnail images may be created and displayed as a list as necessary based on display layout information such as the positional information of the display region.

The analyzer looks at the listed thumbnail images, confirms the arrangement or the like of graphs such as chromatograms or spectrums, and indicates one considered to be optimally suited to the purpose or situation using the selection and indication means. Specifically, the device should be configured so that a thumbnail image can be selected and indicated by clicking with a pointing device such as a mouse. After receiving this selection and indication, the display processing means acquires display layout information corresponding to the selected thumbnail image from the layout information storage means, determines the division of display regions or the sizes of each of the display regions based on the display layout information, arranges graphs such as chromatograms or spectrums created from analytical data by assigning the graphs to each of the display regions, and displays and outputs the display screen configured in this way on a monitor. As a result, the chromatograms or spectrums are displayed in accordance with the display layout corresponding to the thumbnail image selected and indicated by the analyzer. When the analyzer would like to change the display layout, the analyzer reselects a thumbnail image from the list of thumbnails using the selection and indication means, and the display processing means changes the display layout and updates the display output in accordance with the selection.

In addition, the device may also be configured so that display layout information defining a plurality of display layouts created in advance by the manufacturer of the analytical device or the provider of the data processing software is stored in the layout information storage means and so that the analyzer—that is, the user—can select any display layout from among these layouts. On the other hand, the device may also be configured so that the display layouts are created by the actual user and are registered in the layout information storage means.

That is, one mode for carrying out the analytical data display processing device of the present invention may be configured so as to further comprise:

e) a display layout setting means for allowing the analyzer to set a given display layout on the display screen; and f) a layout information adding means for newly storing layout information defining the display layout set by the display layout setting means in the layout information storage means.

With this configuration, display layouts that are easy for the actual analyzer to use or that are specified to the purpose of analysis or the situation by the analyzer are registered in addition to ready-made standard display layouts created in advance by the device manufacturer or the like, so that not only the analyzer in question, but also other users sharing the device can perform analysis operations using the display layouts. In addition, since the display layouts created by an analyzer can also be selected after being confirmed by thumbnail images, it is unnecessary for the analyzer to assign a name or remember a name for summoning the display layout when registering a display layout newly created by the analyzer. Therefore, the burden of the analyzer is reduced, and the operating efficiency is improved.

In addition, when displaying a plurality of chromatograms by assigning the chromatograms to a single display region, as in the conventional example, the device is preferably configured so that overlapping display and parallel display can be selected as the display format of the plurality of chromatograms, but in the case of parallel display, the vertical axis (intensity axis) of each chromatogram becomes too small and difficult to view when the number of chromatograms to be displayed is large.

Therefore, one mode for carrying out the analytical data display processing device of the present invention may be configured so that at the time of display in accordance with a display layout with parallel display selected as the display format, the display processing means divides the chromatograms into groups so that chromatograms obtained for the same parameter among the plurality of assigned chromatograms belong to the same group, and chromatograms belonging to the same group are displayed in an overlapping manner in the same graph.

The "parameter" described here is the mass-to-charge ratio when the analytical device is a chromatographic mass spectrometer, for example, and the wavelength and or the absorbance unit when the device is a chromatograph device using a PDA as a detector. The "parameter" can also be electrical potential differences for Evapourative Light Scattering Detectors, Conductivity Detectors and Fluorescence Detectors, or refractive index units for Refractive Index Detectors. In other words, a plurality of mass chromatograms for the same mass-to-charge ratio obtained from different samples should be displayed in an overlapping manner on the same graph.

In addition, the thumbnail images described above are preferably images which make it possible to identify whether the information assigned to each of the display regions is a chromatogram or a spectrum and to identify the type of the detector in which analytical data is collected, and the images preferably have an expression format such that the display formats for overlapping display and parallel display can be identified. Here, the type of the detector is a mass spectrometer, a PDA detector, or the like.

As a result, when an analyzer views the list of thumbnail images, it can be easily understood how the chromatograms or spectrums will be displayed when the analysis results are actually displayed. This makes it possible to reduce inappropriate selection operations due to selection mistakes or misunderstandings of the thumbnail images by the analyzer, which makes it possible to improve operability.

In addition, when a plurality of chromatograms are assigned to a single display region and overlapping display is designated in the analytical data display processing device of the present invention, the display processing means should display chromatograms other than the designated chromatogram in a translucent manner.

As a result, even when multiple chromatograms are displayed in an overlapping manner within a single display region, for example, the chromatogram on which the analyzer wishes to focus attention is emphasized, and the shapes of the overlapping chromatograms can also be confirmed.

Further, in this case, the display processing means should fill in the peak regions detected in the designated chromatogram and fill in the peak regions detected in other chromatograms in a translucent manner. This makes it possible to express information such as the peak areas of chromatograms in the background.

When implementing translucent display as described above, the device should be provided with a function capable of setting the degree of transparency. As a result, when comparing a sample on which attention is focused and samples for comparison, for example, the degree of translucency of the chromatograms resulting from the samples for comparison may be set to a low level so that the chromatogram resulting from the sample on which attention is focused and the chromatograms resulting from the samples for comparison can be compared in roughly the same states. In addition, when the analyzer wishes to view only a characteristic chromatogram from among chromatograms originating from many samples, the degree of translucency of the chromatograms other than the one on which attention is focused may be set to a high level so that the chromatogram on which attention is focused can be emphasized further.

Further, when a chromatogram that is not made translucent as described above is designated, the designation of that chromatogram should be switchable by means of a key operation or the operation of a GUI such as a spin button, for example, using a pointing device. This makes it possible for the analyzer to easily confirm the shape of each chromatogram.

In addition, in the analytical data display processing device of the present invention, it is preferable to make it possible to add explanatory notes to peak portions in depicted chromatograms or spectrums or any positions within the display region. Any graph such as a chromatogram or a spectrum may also be pasted as a minimized image instead of an explanatory note.

Effect of the Invention

With the analytical data display processing device of the present invention, after the analyzer visually confirms images of ready-made display layouts prepared in advance or unique display layouts created by the actual analyzer, it is possible to select any display layout from among these images. Therefore, even if there are many options for display layouts, the analyzer can easily and intuitively comprehend the content of the display layouts and select an appropriate display layout suited to the purpose of analysis or the situation at that time. In particular, even if the display layout is not a display layout created by the actual analyzer but is rather a display layout created by another analyzer or a display layout created by the software manufacturer, the analyzer can accurately grasp the display format or the like, so indecision can be reduced when selecting a display layout. This makes it possible to efficiently advance the analysis operation and to perform accurate analysis by reducing operational mistakes or judgment mistakes of the analyzer during the analysis operation.

Further, when chromatograms are displayed in an overlapping manner in the analytical data display processing device of the present invention, the curves or peaks of chromatograms other than the chromatogram on which attention is focused are filled in with a translucent display so that many chromatograms in the background can be visually recognized while emphasizing the chromatogram on which attention is to be focused. This makes it possible to prevent the overlooking of necessary information at the time of analysis. In addition, by selecting overlapping display when the number of chromatograms is large, the space of the display region can be conserved so that other useful information can be displayed in the conserved space.

DETAILED DESCRIPTION OF THE EXEMPLARY EMBODIMENTS

Figure 1:
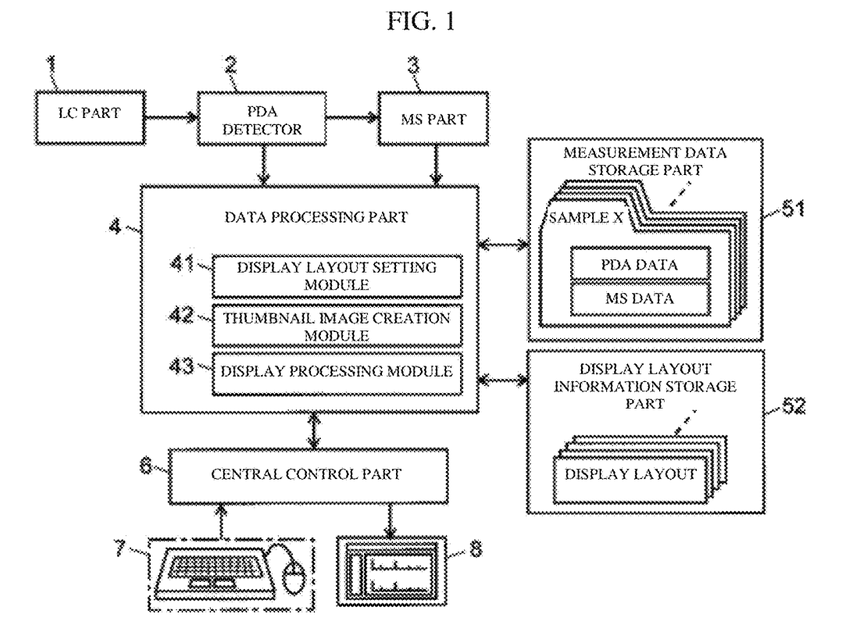
FIG. 1 is a schematic configuration diagram of an embodiment of an LC/MS system containing the analytical data display processing device of the present invention.
Figure 2:
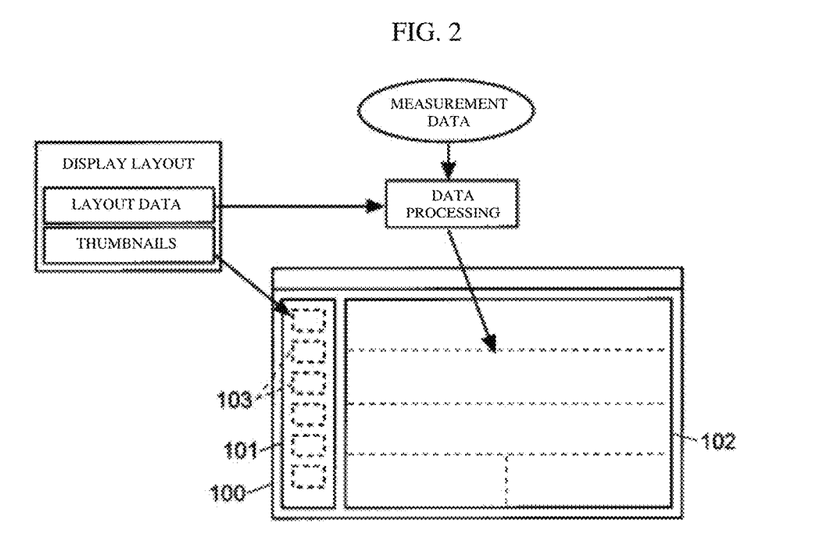
FIG. 2 is a conceptual diagram for explaining the characteristic display processing of the LC/MS system of this embodiment.

An embodiment of an LC/MS system containing the analytical data display processing device of the present invention will be described hereinafter with reference to the attached drawings. FIG. 1 is a schematic configuration diagram of an LC/MS system of this embodiment, and FIG. 2 is a conceptual diagram for explaining the characteristic display processing of the LC/MS system of this embodiment.

This LC/MS system comprises a liquid chromatograph (LC part) 1 for temporally separating components contained in a sample, a PDA detector 2 serving as a first detector for detecting each of the separated components, a mass spectrometer (MS part) 3 for separating and detecting each of the components in a sample passing through the PDA detector 2 (or partially diverged in front of the PDA detector) in accordance with the mass-to-charge ratio m/z, a data processing module 4 for processing data acquired by the PDA detector 2 and the MS part 3, a measurement data storage module 51 for storing measurement data, a display layout information storage module 52 for storing display layout information described below, a central control part 6 serving as a user interface or the like, an operation part 7 serving as a pointing device such as a keyboard or a mouse connected to the central control part 6, and display part 8 serving as a display monitor.

The data processing part 4 is equipped with functional blocks such as a display layout setting module 41, a thumbnail image creation module 42, and a display processing module 43 in order to realize the characteristic display described below.

The data processing part 4, the measurement data storage part 51, the display layout information storage part 52, and the central control part 6 use a personal computer as a hardware resource, and the functions of each part can be realized using the computer to execute specialized data processing software installed on the personal computer in advance.

In the LC/MS system of this embodiment, measurement data is obtained as follows and is stored in the measurement data storage part 51. Specifically, when a sample is introduced into the LC part 1, the components contained in the sample are separated temporally and eluted while passing through a column not illustrated in the drawing. The PDA detector 2 repeatedly measures the absorbance at one or a plurality of wavelengths set in advance at prescribed time intervals. On the other hand, the MS part 3 repeatedly measures the signal intensity corresponding to the ion quantity for one or a plurality of mass-to-charge ratios set in advance at prescribed time intervals. The MS part 3 may also be configured so as to repeat scanning measurements over a prescribed mass-to-charge ratio range.

As a result of the measurements described above, chromatogram data is obtained by the PDA detector 2 from the point when the sample is infused until the point when sample elution is complete for each of the one or plurality of wavelengths, and chromatogram data is obtained by the MS part 3 from the point when the sample is infused until the point when sample elution is complete for each of the one or plurality of mass-to-charge ratios. All of the data collected by a single measurement performed for one sample is summarized in a single data file and stored in the measurement data storage part 51. When another sample is introduced into the LC part 1 and chromatogram data is similarly collected by the PDA detector 2 and the MS part 3, these pieces of data are summarized in another single data file and stored in the measurement data storage part 51. Accordingly, a number of data files corresponding to the number of samples are created and saved in the measurement data storage part 51.

In the LC system of this embodiment, measurement data is obtained in a similar way. The sample is introduced into the LC part 1 and temporally separated as per the LC/MS system. The analysis is performed using detectors such as the PDA detector or any of the other detectors mentioned in the background to this invention. The sample is not detected by a mass spectrometer and the data is processed and displayed as per the LC/MS system.

Various data for defining the display layout within a graph display region 102 provided inside an analysis result display window 100 and thumbnail image data illustrating an image of the display layout are coordinated and stored in the display layout information storage part 52. The data defining the display layout includes the number of panes (display regions) created by dividing the rectangular graph display region 102, the sizes and positions thereof, various graphs such as chromatograms, mass spectrums, or absorption spectrums displayed in each of the panes, and the display format of the graph in each pane so as to enable the various types of display describe below in a state in which the measurement data to be displayed is provided.

On the other hand, the thumbnail image is created so that an overall image of the state in which chromatograms or spectrums are displayed in accordance with that display layout can be grasped. The displayed graph itself, of course, is merely an example, but this serves as an expression format so that the types of graphs assigned to each of the panes (for example, chromatograms, mass spectrums, absorption spectrums, or the like), the type of the detector that acquired the data (for example, a PDA detector, a mass spectrometer, or the like), the display format when a plurality of chromatograms or spectrums are assigned to a single pane (parallel display, base-shifted overlapping display, overlapping display without base shifting, or the like), or the presence or absence of the filling of chromatogram peaks can be easily identified.

Figure 3:
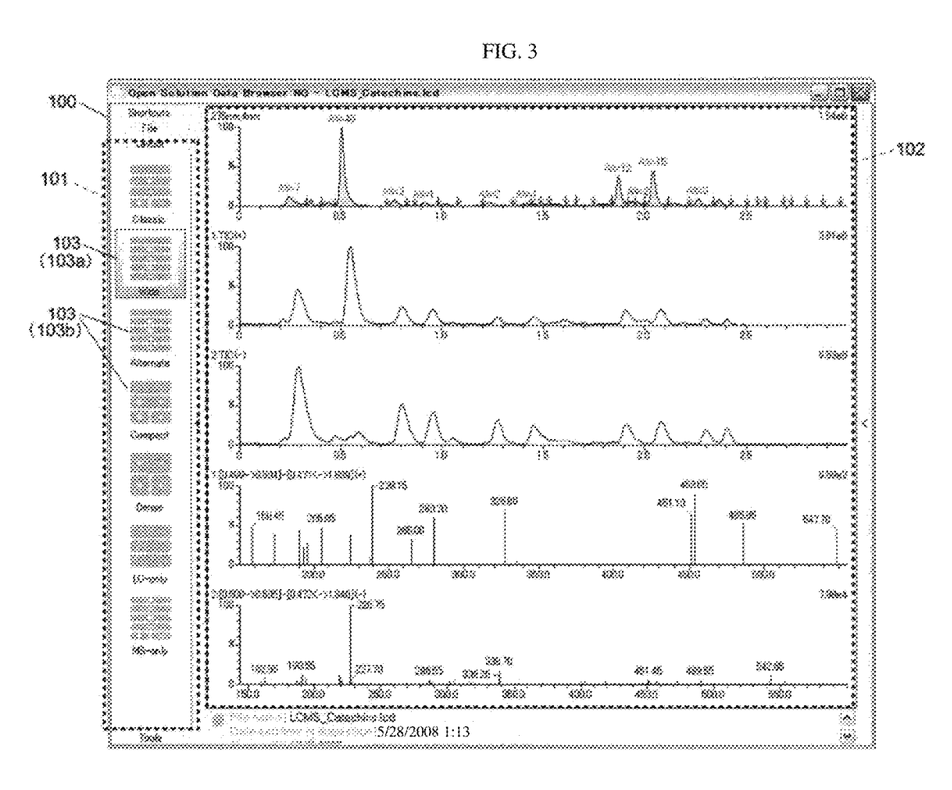
FIG. 3 illustrates an example of a characteristic display screen in the LC/MS system of this embodiment.

Specifically, in the example of FIG. 3, the portions where "+" and "−" signs are displayed in an overlapping manner on the thumbnail images are chromatograms or mass spectrums obtained with a detector capable of acquiring bipolar data such as a mass spectrometer, and the portions where these symbols are not displayed are chromatograms obtained with a detector which only produces unipolar data. When images are based on data obtained with a mass spectrometer, measured signal corresponds to the quantity of positive ions or negative ions, so "+" or "−" signs are overlapped to indicate the data is obtained from positive ions or negative ions. Further, even a graph based on data obtained with the same mass spectrometer may be displayed in more detailed colors so that chromatograms are blue, spectrums are red, and the like. Of course, instead of a determined expression format, the user may also freely set such an expression format.

The display layouts defined by the display layout information stored in the display layout information storage part 52 include ready-made layouts prepared in advance and layouts created by the actual user (or ready-made layouts with modifications or corrections). A ready-made display layout is a layout created in advance by the manufacturer of the LC/MS system and LC system of this embodiment or the manufacturer providing the data processing software. On the other hand, when the actual user creates a display layout, the analyzer performs a prescribed operation from the operation part 7 so as to freely set the display layout within a graph display region 102 such as that illustrated in FIG. 2. When the display layout is established, the display layout setting module 41 creates information defining the display layout set at that time. In addition, the thumbnail image creation module 42 creates a thumbnail image corresponding to that display layout. The display layout information and the thumbnail image are then newly stored in the display layout information storage part 52. In this way, it is possible to create special display layouts specified by the actual user in accordance with the purpose or the situation in addition to ready-made display layouts, and these layouts can be registered.

Next, the operations performed by the analyzer and the corresponding processing when realizing a display in accordance with a given display layout in a state in which measurement data and display layout information are stored as described above will be described.

When the analyzer indicates the file name or the like of measurement data to be displayed by performing a prescribed operation with the operation part 7 and then performs an operation to open an analysis result display screen, the display processing part 43 displays an analysis result display window 100 such as that illustrated in FIG. 2 on the screen of the display part 8. A layout thumbnail bar 101 is arranged on the left side of this window 100, and the display processing module 43 reads out the thumbnail image data contained in all of the display layout information stored in the display layout information storage part 52, creates thumbnail images 103, and displays the images as a list in the layout thumbnail bar 101. When the number of thumbnail images 103 to be displayed is large, the device should be configured so that all of the thumbnail images 103 can be displayed by a scroll bar operation in the vertical direction.

Figure 4:
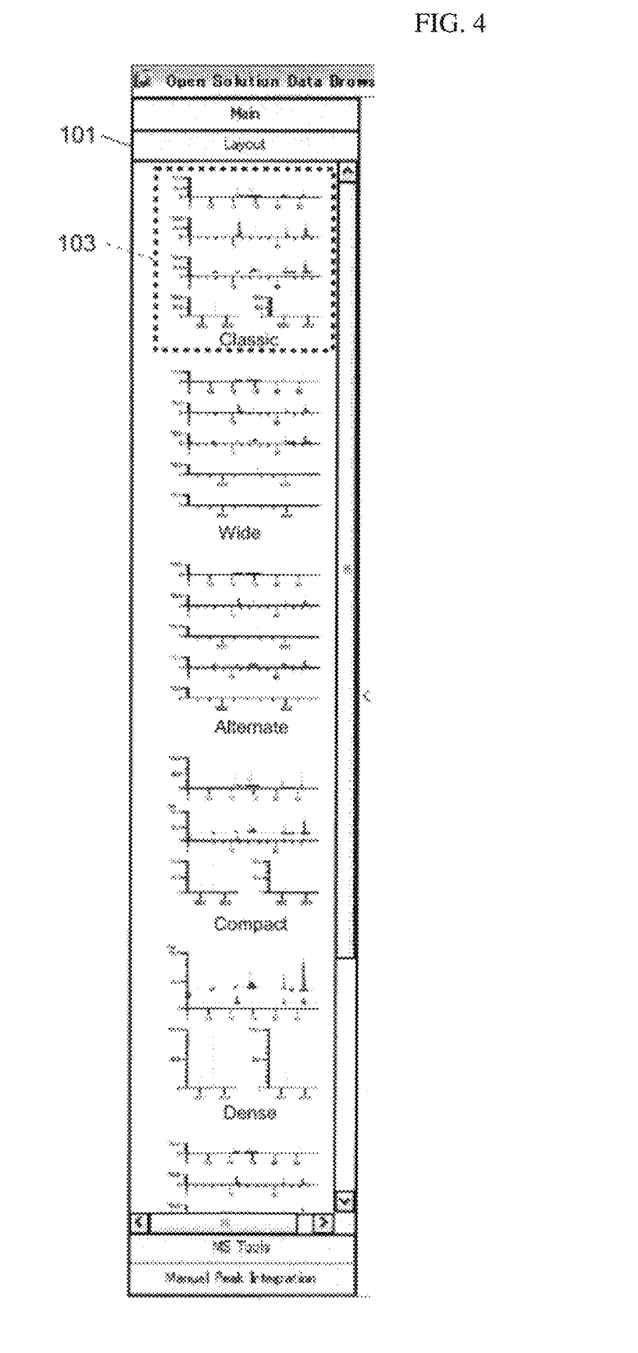
FIG. 4 illustrates an example of the display layout thumbnail bar in FIG. 3.

FIG. 3 illustrates an example of a characteristic display image in the LC/MS system of this embodiment, and FIG. 4 illustrates an example of the display layout thumbnail bar in FIG. 3. Here, a name indicating a characteristic of the display layout such as (Classic) or (Wide) is attached to each display layout, but this is merely auxiliary information, and it is important for the image of the appearance of the display layout to be expressed in the thumbnail image 103 as illustrated in FIG. 4. The analyzer confirms this thumbnail image 103, finds a desired display layout suited to the purpose or the situation, and selects and indicates any one thumbnail image 103 with a clicking operation or the like using the pointing device of the operation part 7. In FIG. 3 and other drawings, the selected and indicated thumbnail image is expressed by the symbol 103a, and other thumbnail images are expressed by the symbol 103b.

After receiving the selection and indication of the thumbnail image 103, the display processing module 43 obtains display layout information corresponding to the selected thumbnail image 103, creates a display image in which chromatograms, mass spectrums, absorption spectrums, or the like created from measurement data are arranged appropriately in accordance with this information, creates an image in which this image is fit into the graph display region 102, and displays the image on the screen of the display part 8. FIG. 3 is an example of the display when a display layout in which three chromatograms and two mass spectrums are arranged over the entire horizontal axis of the graph display region 102 is selected. In this example, the uppermost chromatogram is a chromatogram for a specific wavelength produced by the PDA detector 2, the second chromatogram is a total ion chromatogram for positive ions produced by the MS part 3, and the third chromatogram is a total ion chromatogram for negative ions produced by the MS part 3. In addition, the upper mass spectrum is a mass spectrum of positive ions at a given point in time, and the lower mass spectrum is a mass spectrum of negative ions at roughly the same point in time.

When the analyzer selects and indicates another thumbnail image 103 in the layout thumbnail bar 101 of the analysis result display window 100 such as that illustrated in FIG. 3, the display processing module 43 recreates an image to be fit into the graph display region 102 based on the display layout information corresponding to the newly selected thumbnail image 103 (103a). As a result, the display in the graph display region 102 is updated to information corresponding to the newly selected display layout. In this way, by simply selecting and indicating a thumbnail image 103 indicating an image of each display layout, the analyzer can select any layout from among the display layouts prepared at that point and display chromatograms or spectrums in a format corresponding to this display layout.

Figure 5:
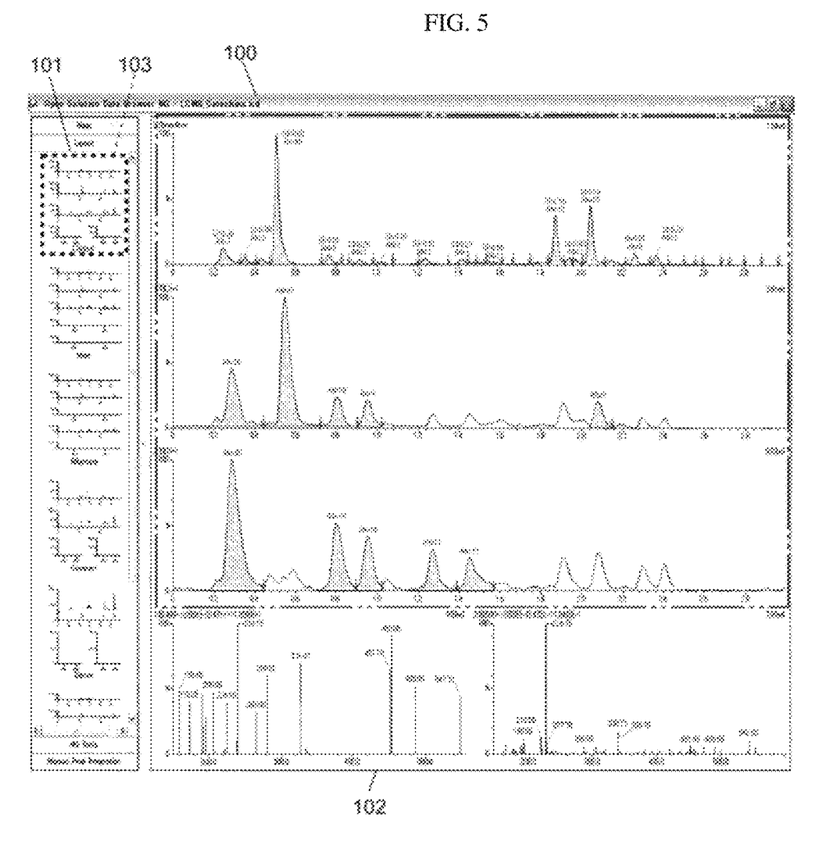
FIG. 5 illustrates an example of a display screen in the LC/MS system of this embodiment.
Figure 6:
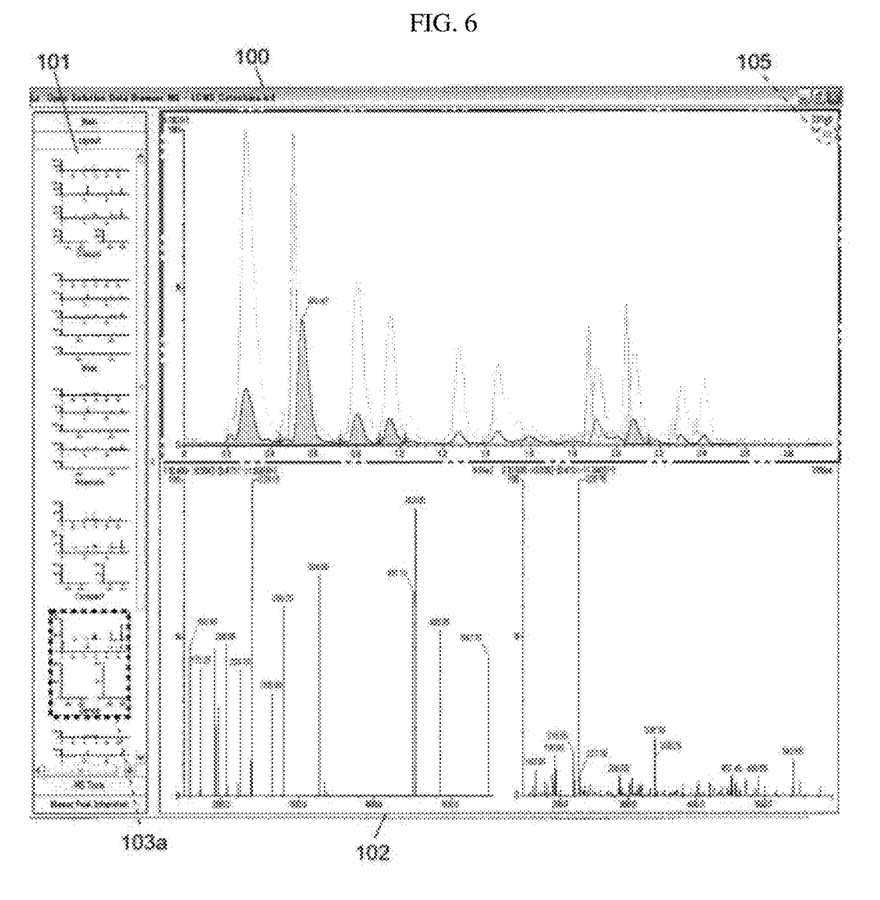
FIG. 6 illustrates another example of a display screen in the LC/MS system of this embodiment.

FIGS. 3 and 5 described above are both examples in which a plurality (specifically, three) of chromatograms are displayed in parallel, but FIG. 6 is a display example of a case in which the selected and indicated display layout is one in which the same plurality of chromatograms as FIG. 5 are displayed in an overlapping manner without a base shift. In FIG. 5, specific peaks (designated by the analyzer, for example) in the chromatogram are filled in so that the peak areas can be easily compared. On the other hand, in FIG. 6, the curve of the chromatogram designated by the analyzer from among the three overlapping chromatograms is displayed in the non-translucent state as usual, and the peaks in this chromatogram are filled in as usual, whereas the curves of the other two chromatograms and filled portions of the peaks of these chromatograms are displayed in a translucent manner with mutually differing degrees of transparency. The respective degrees of translucency of the curves or filled portions of the respective chromatograms can be adjusted on a small screen displayed by a popup menu or the like.

As in the example illustrated in FIG. 6, when all (or many) of the chromatograms are overlapped as a result of the selection of the display layout, the chromatograms other than the chromatogram on which attention is to be focused are depicted translucently so that the chromatogram on which attention is to be focused is emphasized. Moreover, the shapes of the overlapping chromatograms can also be sufficiently confirmed, and the filling of the chromatogram peaks is also made translucent, so the information of the chromatograms in the background can also be sufficiently grasped. In addition, as can be seen from a comparison of FIGS. 5 and 6, in a display layout such as that illustrated in FIG. 6, even if a plurality of chromatograms are displayed, the space occupied by the display can be small, so the mass spectrums can be magnified by a corresponding amount and displayed.

In addition, a spin button 105 is provided on the upper right part of the chromatograms displayed in an overlapping manner, and the chromatograms that are not displayed translucently can be sequentially toggled by clicking this spin button 105 (or by performing a key operation). This toggling makes it possible to easily confirm the shape of each chromatogram.

Further, when a peak is designated by a clicking operation or the like on a given chromatogram that is displayed, peaks appearing at the same time as the corresponding peak are also highlighted in the other chromatograms being displayed translucently. As a result, even if the peaks are hidden in the background and difficult to see, the peaks appearing at the same time in the plurality of chromatograms can be easily confirmed.

In addition, even if the translucent display of FIG. 6 is used, when chromatograms obtained from a plurality of samples are displayed together, the number of chromatograms to be displayed becomes too large, which may make the chromatograms difficult to view. Therefore, a plurality of regions for displaying chromatograms in a parallel display format are prepared to accommodate such cases. Here, a plurality of chromatograms should be grouped based on property information of the chromatograms such as the mass-to-charge ratio or the wavelength, and a single display region should be assigned for each group so that a plurality of chromatograms belonging to a single group are displayed in an overlapping manner in a single display region. By preparing such a grouped parallel display as one option for a display layout, it is possible to realize a display suited to the analysis operation, even when the number of chromatograms is quite large.

In addition, the display processing module 43 in the LC/MS and LC system of this embodiment has functions for shrinking another graph and pasting the graph as an image or adding any explanatory note to any position on a graph such as a chromatogram or a mass spectrum depicted on the screen of the display part 8 as illustrated in FIGS. 3, 5, and 6. A specific example of this will be described with reference to FIGS. 7 to 12.

Figure 7:
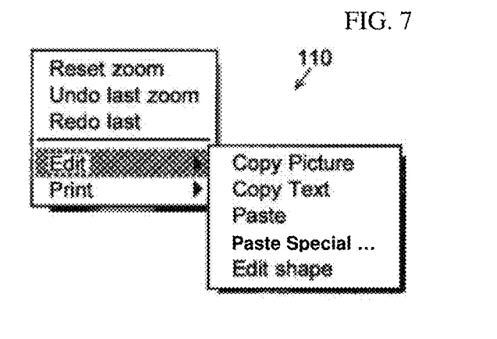
FIG. 7 illustrates a context menu displayed in the LC/MS system of this embodiment.

For example, when the analyzer performs right clicking operation or an equivalent operation with the pointing device in a state in which the analysis result display window 100 is opened and a pointer is displayed in a superimposed manner on the screen, the display processing module 43 provides a popup display of a context menu 110 such as that illustrated in FIG. 7 on the screen. When the analyzer selects "Edit" from this context menu 110 and further clicks "Copy Picture" from among the lower tier of options, a given graph being displayed can be copied and pasted as an image.

Figure 8:
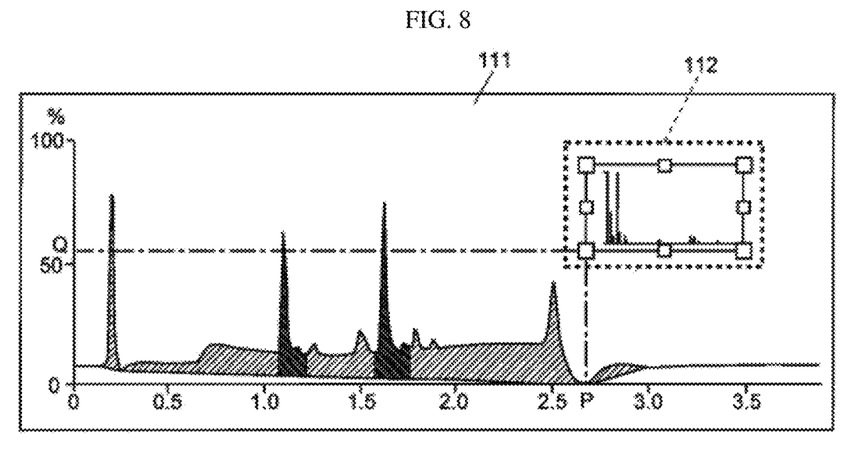
FIG. 8 illustrates an example of a display image when another graph is pasted as an image to a single graph in the LC/MS system of this embodiment.
Figure 9:
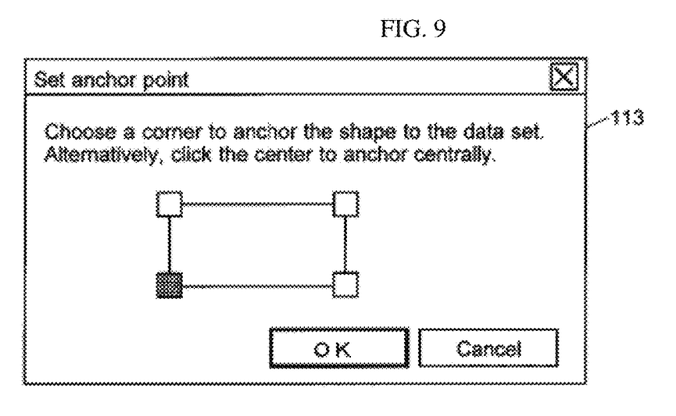
FIG. 9 illustrates an example of a display image for designating an anchor point of an image to be pasted in FIG. 8.

That is, when the analyzer performs an operation to enclose a given graph displayed in the analysis result display window 100, the display processing module 43 forms an image of the display of the designated region and temporarily holds the image. When the analyzer then designates a given position on the screen and clicks "Paste," the display processing module 43 pasts the image that had been temporarily held at the designated position. FIG. 8 is a display example when a graph image 112 formed by shrinking another graph (a mass spectrum in this example) is pasted to a single graph (a chromatogram in this example) 111. A location serving as an anchor point can be designated in another popup window 113 such as that illustrated in FIG. 9 for the graph image 112 pasted at this time. As an anchor point, any one of the four corners of the graph image 112 to be pasted or the entire image can be designated. FIG. 9 is a state in which the lower left corner is designated as an anchor point.

When an anchor point is designated and the "OK" button is clicked in the popup window 113 illustrated in FIG. 9, the anchor point is established, and the □ mark indicating the anchor point in the graph image 112 illustrated in FIG. 8 disappears. When the anchor point of the pasted graph image 112 is established, the pasting position of the graph image 112 on the graph 111 is established. For example, when the lower left corner of the graph image 112 is designated as an anchor point, the lower left corner position of the graph image 112 is fixed to the position of P on the horizontal axis and Q on the vertical axis of the graph 111. Accordingly, even if an operation for magnifying the horizontal or vertical axis of the group 111 or for scrolling is performed, for example, the lower left corner of the graph image 112 is maintained at the position of P on the horizontal axis and Q on the vertical axis of the graph 111.

Figure 10:
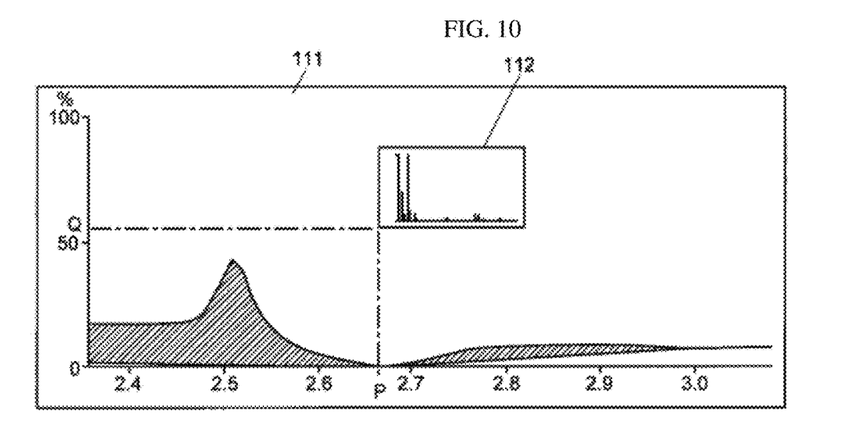
FIG. 10 illustrates an example of a display image when an expansion operation is performed on the horizontal axis of the graph illustrated in FIG. 8.

FIG. 10 is an image when the magnification operation is performed on the horizontal axis of the graph illustrated in FIG. 8. The lower left corner of the graph image 112 is maintained at the position of P on the horizontal axis and Q on the vertical axis of the graph 111. That is, when the graph image 112 is pasted near a peak on which the analyzer is focusing attention in the graph 111, the graph image 112 is also displayed near that peak even when the peak is magnified. Accordingly, even if the time axis of the chromatogram is magnified or scrolled, for example, the graph image 112 and the mass spectrum at a given point in time can be visually recognized with certainty.

Figure 11:
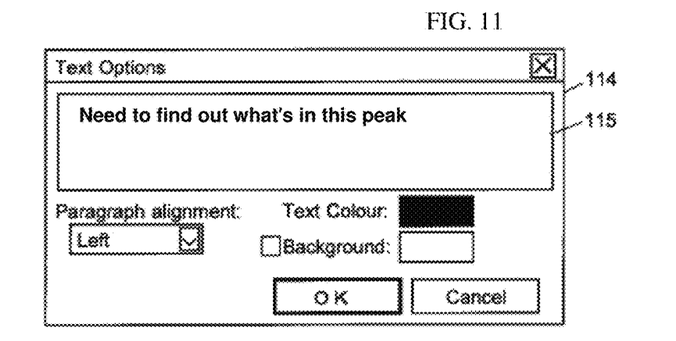
FIG. 11 illustrates an example of an editing screen for explanatory notes illustrated in FIG. 12.

As in the case of the graph image 112 described above, an appropriate explanatory note can be pasted as an image on the graph 111. FIG. 11 is an example of a popup window 114 for creating or editing an explanatory note. When the analyzer enters any letters or text into a text box 115 on this screen and clicks the "OK" button, the display processing module 43 confirms the inputted text so that a text image in which the text is displayed can be pasted at any position.

Figure 12:
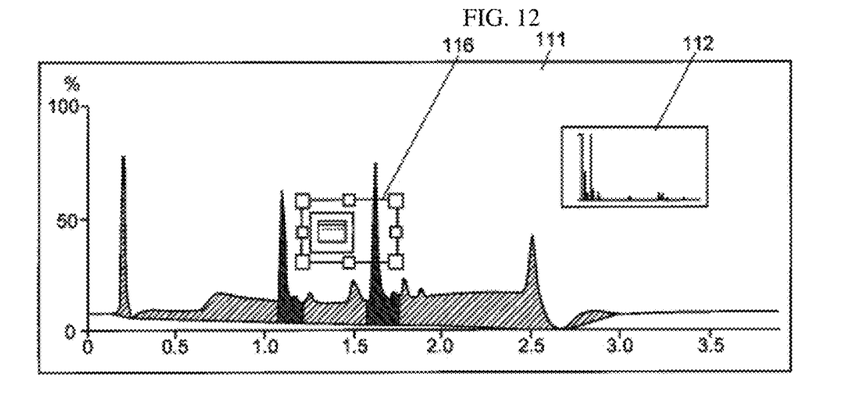
FIG. 12 illustrates an example of a display image when explanatory notes are further pasted to the graph illustrated in FIG. 8.

FIG. 12 illustrates an example of a display image when a text image 116 is further pasted on the graph 111 illustrated in FIG. 8. As in the case of the graph image 112, the position of an anchor point can be arbitrarily determined for this text image 116 as well, which makes it possible to fix the position at which the image is displayed on the graph 111.

In the embodiment described above, chromatograms, mass spectrums, and absorption spectrums based on data collected by LC/MS were displayed, but the graphs to be displayed are not limited to these examples as long as the graphs are created based on data collected by analysis. For example, in the MS part 3 and the PDA detector 2, data having the three dimensions of time, signal intensity, and mass-to-charge ratio or wavelength is collected, so mapping images such as two-dimensional contour maps can be created based on this data. Such mapping images can be displayed in the display region.

Further, in addition to the descriptions above, it is clear that appropriate variations, modifications, and additions made within a scope adhering to the gist of the present invention are also included in the scope of the patent claims of this application.

EXPLANATION OF REFERENCES

1 . . . LC part
2 . . . PDA detector
3 . . . MS part
4 . . . data processing part
41 . . . display layout setting module
42 . . . thumbnail image creation module
43 . . . display processing module
51 . . . measurement data storage part
52 . . . display layout information storage part
6 . . . central control part
7 . . . operation part
8 . . . display part
100 . . . analysis result display window
101 . . . layout thumbnail bar
102 . . . graph display region
103, 103a, 103b . . . thumbnail images
105 . . . spin button
110 . . . context menu
111 . . . graph
112 . . . graph image
113, 114 . . . popup windows
115 . . . text box
116 . . . text image

What is claimed:

1. An analytical data display processing device for creating graphs including chromatograms or spectrums based on analytical data collected by sample analysis and performing processing to display one or a plurality of graphs by assigning the graphs to each of a plurality of display regions set within a display screen, the device comprising:
   a processor; and
   a computer-readable medium storing software instructions that, when executed by the processor, cause the processor to:
   a) store, in a display layout information storage, a plurality of display layouts, each display layout defined at least by settings of a plurality of display regions within the display screen, assignment of types of graphs displayed in each of the display regions, and a display format of the graphs assigned to each of the display regions, wherein the types of graphs include chromatograms or spectrums;
   b) provide a list display of thumbnail images corresponding to the plurality of display layouts in a display region differing from the display regions where the graphs are assigned within the display screen, wherein each thumbnail image comprises an image of a state in which graphs are displayed in accordance with a corresponding display layout;
   c) allow an analyzer to select and indicate one of the displayed thumbnail images; and
   d) when one thumbnail image is selected and indicated, construct, display, and output a display screen on which the graphs created based on designated analytical data are arranged in accordance with a display layout corresponding to the selected and indicated thumbnail image.

2. The analytical data display processing device according to claim 1, wherein the computer readable medium further comprises software instructions that, when executed by the processor, cause the processor to:

e) allow the analyzer to set a given display layout on the display screen; and f) newly store, in the display layout information storage, layout information defining the given display layout set by the analyzer.

3. The analytical data display processing device according to claim 1, wherein the computer readable medium further comprises software instructions that, when executed by the processor, cause the processor to:

provide options for overlapping display and parallel display as the display format;

divide a plurality of chromatograms into groups so that chromatograms obtained for the same parameter among the plurality of chromatograms belong to the same group; and display chromatograms belonging to the same group in an overlapping manner in a single display region.

4. The analytical data display processing device according to claim 1, wherein the computer readable medium further comprises software instructions that, when executed by the processor, cause the processor to:

create the thumbnail images to identify whether a type of graph assigned to each of the display regions is a chromatogram or a spectrum and to identify a type of detector in which analytical data is collected, wherein the thumbnail images are in an expression format to identify the display formats for overlapping display and parallel display.

5. The analytical data display processing device according to claim 1 wherein the computer readable medium further comprises software instructions that, when executed by the processor, cause the processor to:

when a plurality of chromatograms are assigned to a single display region and overlapping display is selected, display chromatograms other than a designated chromatogram in a translucent manner.

6. The analytical data display processing device according to claim 5, wherein the computer readable medium further comprises software instructions that, when executed by the processor, cause the processor to:

fill in peak regions detected in the designated chromatogram and fill in the peak regions detected in other chromatograms in a translucent manner.

7. The analytical data display processing device according to claim 6, wherein the computer readable medium further comprises software instructions that, when executed by the processor, cause the processor to:

fill in the peak regions detected in other chromatograms in a translucent manner with respective adjustable, mutually differing degrees of transparency.

8. The analytical data display processing device according to claim 5, wherein the computer readable medium further comprises software instructions that, when executed by the processor, cause the processor to:

switch designation of a chromatogram that is not made translucent by a key operation or operation of a GUI using a pointing device.

9. The analytical data display processing device according to claim 1, wherein the computer readable medium further comprises software instructions that, when executed by the processor, cause the processor to:

add explanatory notes or pictures to peak portions in depicted chromatograms or spectrums or any positions within a display region.

10. The analytical data display processing device according to claim 1, wherein the types of graphs consist of graphs created based on data collected by sample analysis.

11. An analytical data display processing method for creating graphs including chromatograms or spectrums based on analytical data collected by sample analysis and performing processing to display one or a plurality of graphs by assigning the graphs to each of a plurality of display regions set within a display screen, the method comprising:

a) storing, in a display layout information storage, a plurality of display layouts, each display layout defined at least by settings of a plurality of display regions within the display screen, assignment of types of graphs displayed in each of the display regions, and a display format of the graphs assigned to each of the display regions, wherein the types of graphs include chromatograms or spectrums;

b) providing a list display of thumbnail images corresponding to the plurality of display layouts in a display region differing from the display regions where the graphs are assigned within the display screen, wherein each thumbnail image comprises an image of a state in which graphs are displayed in accordance with a corresponding display layout;

c) allowing an analyzer to select and indicate one of the displayed thumbnail images; and d) when one thumbnail image is selected and indicated, constructing, displaying, and outputting a display screen on which the graphs created based on designated analytical data are arranged in accordance with a display layout corresponding to the selected and indicated thumbnail image.

12. The analytical data display processing method according to claim 11, further comprising:

e) allowing the analyzer to set a given display layout on the display screen; and f) newly storing, in the display layout information storage, layout information defining the display layout set by the analyzer.

13. The analytical data display processing method according to claim 11, further comprising providing options for overlapping display and parallel display as the display format;

dividing a plurality of chromatograms into groups so that chromatograms obtained for the same parameter among the plurality of chromatograms belong to the same group; and displaying chromatograms belonging to the same group in an overlapping manner in a single display region.

14. The analytical data display processing method according to claim 11, further comprising creating the thumbnail images to identify whether a type of graph assigned to each of the display regions is a chromatogram or a spectrum and to identify a type of detector in which analytical data is collected, wherein the thumbnail images are in an expression format to identify the display formats for overlapping display and parallel display.

15. The analytical data display processing method according to claim 11, further comprising when a plurality of chromatograms are assigned to a single display region and overlapping display is selected, displaying chromatograms other than a designated chromatogram in a translucent manner.

16. The analytical data display processing method according to claim 15, further comprising filling in peak regions detected in the designated chromatogram and filling in peak regions detected in other chromatograms in a translucent manner.

17. The analytical data display processing method according to claim 16, further comprising
 filling in the peak regions detected in other chromatograms in a translucent manner with respective adjustable, mutually differing degrees of transparency.

18. The analytical data display processing method according to claim 15, further comprising
 switching designation of a chromatogram that is not made translucent by a key operation or operation of a GUI using a pointing device.

19. The analytical data display processing method according to one of claim 11, further comprising
 adding explanatory notes or pictures to peak portions in depicted chromatograms or spectrums or any positions within a display region.

20. The analytical data display processing method according to claim 11, wherein the types of graphs consist of graphs created based on data collected by sample analysis.

\* \* \* \* \*